United States Patent [19]
Adams

[11] Patent Number: 4,873,690
[45] Date of Patent: Oct. 10, 1989

[54] OPTICAL SWITCH

[75] Inventor: Michael J. Adams, Ipswich, United Kingdom

[73] Assignee: British Telecommunications public limited company, Great Britain

[21] Appl. No.: 230,837

[22] PCT Filed: Dec. 14, 1987

[86] PCT No.: PCT/GB87/00905
§ 371 Date: Aug. 10, 1988
§ 102(e) Date: Aug. 10, 1988

[87] PCT Pub. No.: WO88/04791
PCT Pub. Date: Jun. 30, 1988

[30] Foreign Application Priority Data
Dec. 15, 1986 [GB] United Kingdom ............... 8629871

[51] Int. Cl.$^4$ .................................. H01S 3/30
[52] U.S. Cl. ............................. 372/8; 372/96
[58] Field of Search ............ 372/26, 8, 44, 18, 19, 372/9–13; 307/311

[56] References Cited
U.S. PATENT DOCUMENTS

| | | | |
|---|---|---|---|
| 4,359,773 | 11/1982 | Swartz | 372/26 |
| 4,382,660 | 5/1983 | Pratt Jr. et al. | 372/18 |
| 4,468,773 | 8/1984 | Seaton | 372/18 |
| 4,689,793 | 8/1987 | Liu et al. | 372/8 |

FOREIGN PATENT DOCUMENTS 0110388 6/1984 European Pat. Off. .
0169567 1/1986 .
2492995 4/1982 France .

OTHER PUBLICATIONS

Olsson et al., "Optoelectronic Logic Operations by Cleaved-Coupled Cavity Semiconductor Lasers", IEEE Journal of Quantim Electronics vol. QE-19, No. 11 Nov. 1983, pp. 1621–1625.
Sharfin et al., "Femtojoule Optical Switching in Nonlinear Semiconductor Laser Amplifiers"Applied Physics Letters, vol. 48, No. 5, 3 Feb. 1986.

Primary Examiner—Leon Scott, Jr.
Attorney, Agent, or Firm—Nixon & Vanderhye

[57] ABSTRACT

Using a semi-conductor laser amplifier in reflection, an optical switch is achieved which can be applied as either an AND/OR, or a NAND/NOR, logic gate. The amplifier responds to an optical input switching signal and the logical characteristics of its response can be controlled by selection of the drive current to the amplifier. The switch finds application in optical logic or communication systems.

9 Claims, 8 Drawing Sheets (i) or (ii) "1" input ; AND gate operation.

(i) or (ii) "1" input ; OR gate operation

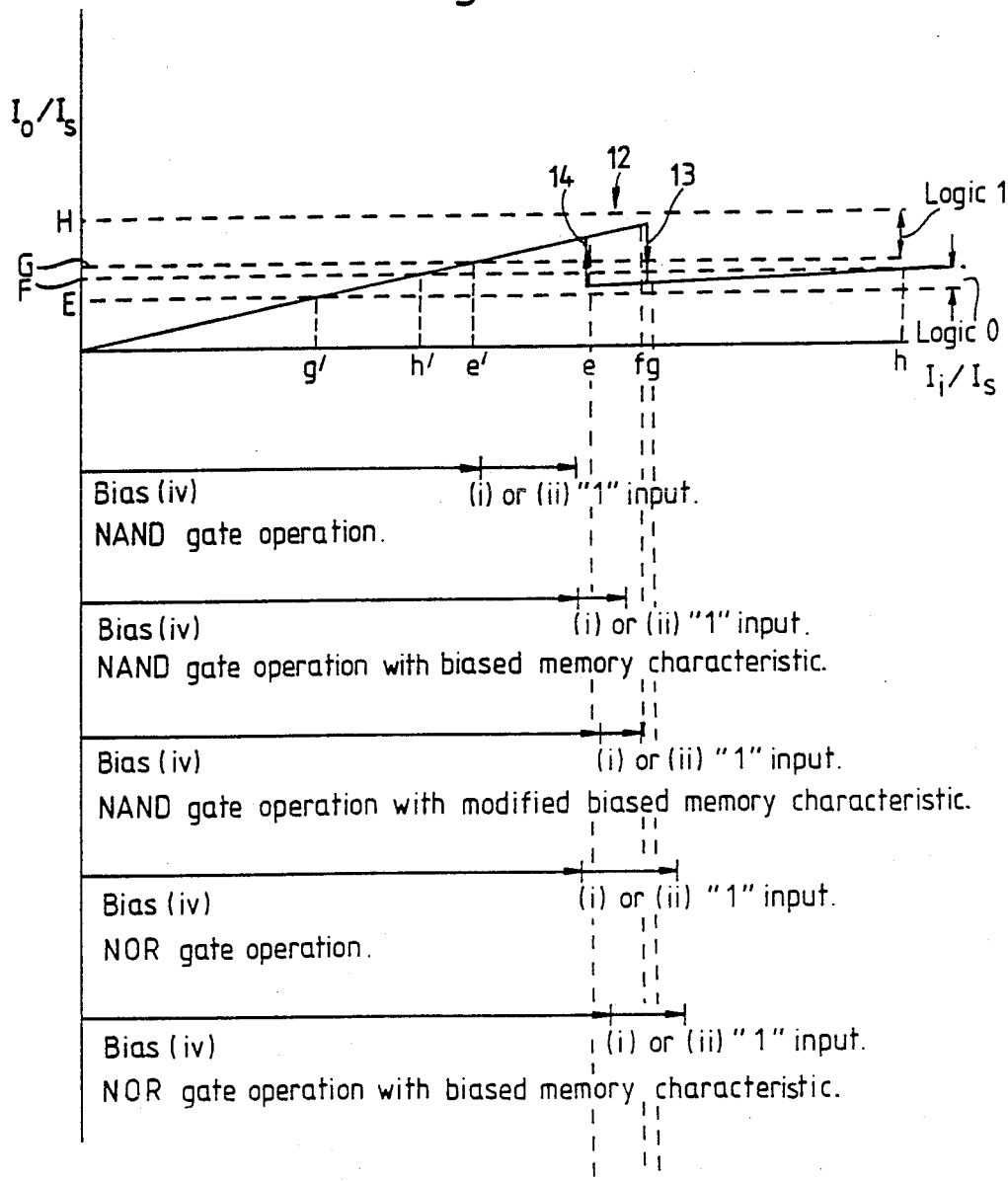

OPTICAL SWITCH

The present invention relates to an optical switch. It finds particular application in optical logic and signal processing.

It is known to use semiconductor optical devices as switches in optical logic and signal processing. They are advantageous in that they can be designed to operate at low power levels, physically take up little space in a signal processing system, operate at wavelengths compatible with those common in optical communications, and potentially can be monolithically integrated with other optical components.

Either passive or amplifying devices can be used as switches. The inherent gain of an amplifying device, such as a laser, reduces the need for additional amplification in a system and therefore gives amplifying devices an advantage compared with passive devices. Further, amplifying devices can be designed to switch at power levels typically of the order of $10^3$ times lower than those required for passive devices, and are readily available.

A semiconductor laser commonly comprises a wafer grown from materials containing combinations of elements from the III and V groups of the Periodic Table. The layers of the wafer are selectively doped to provide a p-n junction, in the vicinity of which lies an active region. Photons can be generated in the active region by radioactive recombination of electron-hole (carrier) pairs under a driving current applied across the junction. By variation in the refractive index of the wafer materials and/or by control of the current distribution in the photodiode, the generated photons are guided to move in a waveguiding region along the photodiode. Feedback is provided to the waveguiding region for instance by reflective end facets of the laser (a Fabry-Perot laser) or by corrugations in an interface which lies near the active region (an example of a distributed feedback laser).

A factor in the choice of materials for optical devices is the fact that silica optical fibres, widely used in today's communications systems, have loss minima at 0.9 $\mu$m, 1.3 $\mu$m and 1.55 $\mu$m approximately. Accordingly there is an especial need for devices which show favourable characteristics when operated using optical radiation in the wavelength range from 0.8 to 1.65 $\mu$m, and especially in the ranges from 0.8 to 1.0 $\mu$m and from 1.3 to 1.65 $\mu$m. (These wavelengths, like all the wavelengths herein except where the context indicates otherwise, are in vacuo wavelengths). Materials which have been found suitable for the manufacture of optical switches with such favourable chracteristics comprise the III-V semiconductor materials, including gallium arsenide, indium gallium arsenide, gallium alluminium arsenide, indium phosphide, and the quaternary materials, indium gallium arsenide phosphides ($In_xGa_{1-x}As_yP_{1-y}$). With regard to the quaternary materials, by suitable choices of x and y it is possible to lattice-match regions of different ones of these materials to neighbouring III-V materials in a device while being able to select the associated band gap equivalent wavelength.

If optical radiation is input to the active region of a semiconductor laser and a driving current applied, amplification of the radiation occurs even when the driving current is below the lasing threshold current necessary for lasing action to occur. The relationship between input and output radiation intensity is non-linear and can show bistability, the output intensity switching rapidly between two values as the input intensity reaches a relevant switching level. The non-linearity arises from changes in the refractive index of the material of the active region. The input radiation in undergoing amplification reduces the free carrier concentration and hence the gain. The refractive index varies with the gain according to the Kramers-Kronig relationship. In turn, the degree of amplification of the input radiation is dependent on a relationship between input wavelength and the refractive index of the active region material. Hence if the refractive index changes but the input wavelength remains constant, the degree of amplification will change and therefore the output radiation intensity.

The relationship between input and output radiation intensity is complicated by another factor which affects the refractive index of the active region material: temperature. Both the laser drive conditions and the input radiation have an effect on temperature. Overall, the interaction of gain, refractive index, driving current and input radiation is complicated and difficult to specify for a specific device.

Bistable switching action in both passive and amplifying devices in response to changes in input radiation can be exploited in optical logic as "AND/OR" or "NAND/NOR" gates. If the bistability comprises a sudden increase in output radiation intensity in response to increasing input radiation, then the device is suitable for use as an "AND/OR" gate. If the bistability comprises a sudden decrease, then the device is suitable for use as a "NAND/NOR" gate. Devices are known which will operate with one or other of these characteristics. For instance, a simple, passive Fabry-Perot cavity (etalon) is known to be capable of acting as an "AND/OR" gate in transmission, while a laser is known to be capable of acting as a NAND/NOR gate in reflection. ("In transmission" describes the case where the input and output ports of a device are at opposing ends of the device while "in reflection" describes the case where the input and output ports are at the same end).

It has now been discovered that a single amplifying device can be used either as an AND/OR, or as a NAND/NOR logic gate.

It is an object of the present invention to provide an optical switch which can be used either as an AND/OR, or as a NAND/NOR, logic gate.

According to the present invention, there is provided an optical switch comprising a semiconductor laser amplifier for use in reflection, means for coupling an detuned optical switching signal to the amplifier, and means for applying a driving current of less than the lasing threshold current to the amplifier, which driving current can be selected to have one of at least two different values, the amplifier being operable as an AND/OR logic gate at a first of those values, and operable as a NAND/NOR logic gate at the second of those values.

The amplifier may comprise a Fabry-Perot or a distributed feedback (DFB) laser. In each case, the switching signal should be detuned in that its wavelength should be such as to avoid a resonance of the laser. Preferably, the wavelength should be one for which the amplifier shows strong gain however. In the case of a Fabry-Perot laser, the switching signal should be detuned from a cavity resonance of the laser. In the case of a DFB laser, the switching signal should be detuned from an output peak on the short wavelength side of a stop band.

The term stop band is used here, in the usual way, to describe a range of wavelengths of an input signal to a DFB device for which the Bragg conditions are satisfied and the device acts to reflect rather than transmit most or all of the input signal.

Optical switches according to embodiments of the present invention can benefit from an advantage known to be associated with the use of passive devices in reflection, that is lower critical input intensities using reflective coatings on the back facet.

Because the devices are active rather than passive, there is considerable control available over the operating parameters used.

An optical switch according to an embodiment of the present invention will now be described, by way of example only, with reference to the accompanying Figures in which:

FIGS. 2a and 2b show in schematic graph form the optical output response of the switch of FIG. 1 to optical switching signals when being operated as an AND-/OR gate and as a NAND/NOR gate respectively;

Figure 1:
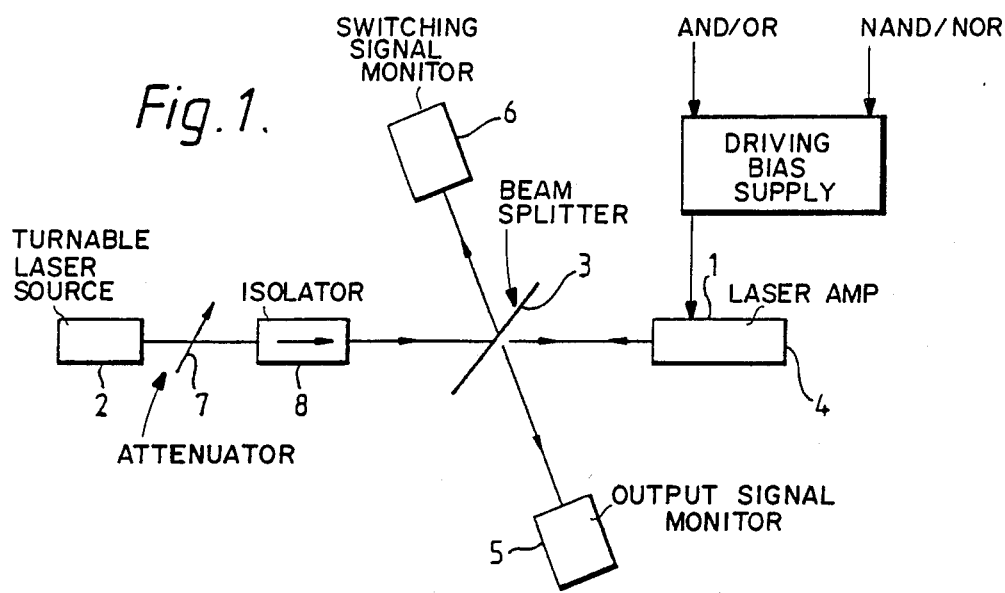
FIG. 1 shows a schematic representation of the optical switch, means for supplying a switching signal to the switch, and means for detecting the response of the switch to the switching signal.

Referring to FIG. 1, the switch comprises a double channel planar buried heterostructure (DCPBH) laser amplifier 1 used in reflection. An optical switching signal is provided by a tunable laser source 2, in combination with an attenuator 7.

A beam splitter 3 mounted between the source 2 and the amplifier 1 deflects a portion of the optical output of the source 2 to a switching signal monitor 6, and a portion of the output of the amplifier 1 to an output signal monitor 5. Interaction between the source 2 and the amplifier 1 is prevented by an isolator 8, between the beam splitter 3 and the source 2, and an attenuator 7 is used to modify the output of the source 2 to produce a controllable switching signal. (The source 2 and the attenuator 7 are provided in the present embodiment to mimic an incoming signal which would in practice comprise a signal carried by for instance an optical communications system in operational use).

The amplifier 1 is a Fabry-Perot DCPBH laser without anti-reflection coatings, 200 μm long, comprising Inp with and InGaAsp active layer. Threshold current at room temperature is 15.7 mA and the emission wavelength 1508 nm.

The laser has an active cross section of 0.4 μm².

The source 2 is a grating tuned external cavity laser which provides a single-mode signal. This laser is an anti-reflection coated ridge waveguide laser, tunable in the range from 1450 to 1580 nm inclusive, again comprising InP with an InGaAsp active layer.

The isolator 8 is provided by two isolating devices, giving together 60 dB isolation. Maximum coupled powers from the source 2 to the amplifier 1 of a few hundred μW can be obtained, as deduced from the resultant photocurrent induced in the amplifier 1. The beam splitter 3 comprises a simple uncoated glass slide, and a fast PIN-pre amp combination (not shown) provides temporal resolution of 100 psecs to allow switching speed measurements by directly modulating the tunable source 2.

Methods of operating the switch will now be described, and results discussed.

The source 2 is tuned to produce a signal detuned from a cavity resonance, showing strong gain, of the amplifier 1 by an amount corresponding to a single-pass (ie non-reflected) pahse change of $-0.3\pi$, or 30% of the difference between adjacent cavity modes. By applying selected combinations of driving current and switching signals, the amplifier 1 can be caused to show optical bistability in three different manners.

Figure 2A:
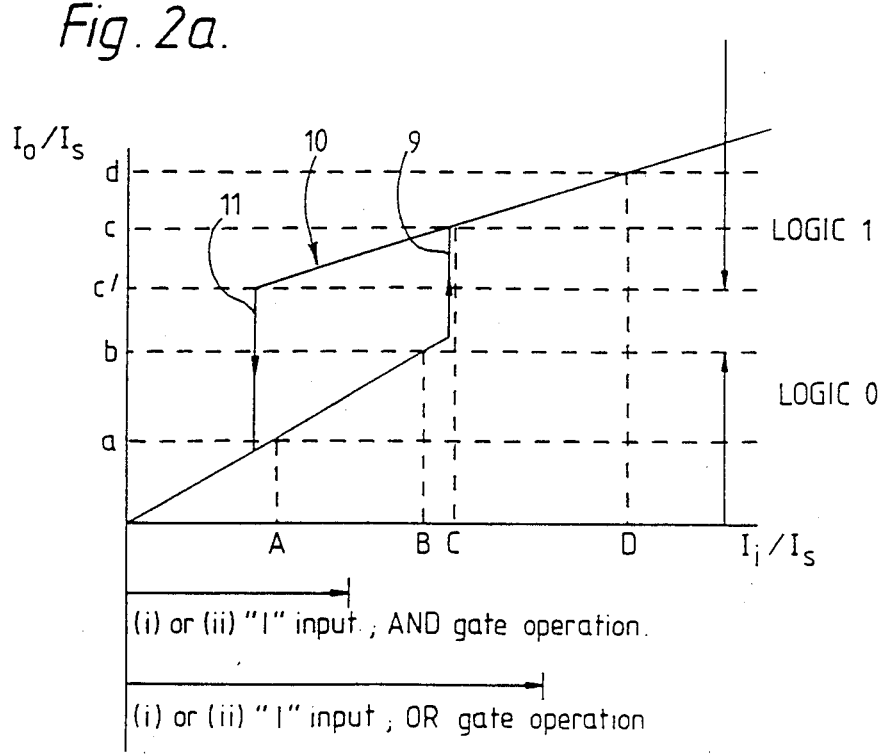

Referring to FIG. 2a, using a drive current which produces a material gain in the amplifier 1 of 0.95 times the lasing threshold gain, the amplifier 1 shows behaviour of a first type which can be exploited as a logic AND/OR gate. In the Figure, the amplifier output signal intensity "Io" is plotted against the input switching signal intensity "Ii", both intensities being normalised using a scaling intensity "Is". It can be seen that "Io/Is" shows an anticlockwise hysteresis loop 10 in response to "Ii/Is", which loop 10 includes a step increase 9 in response to increasing "Ii/Is". If "Ii/Is" increases from a value below the step increase 9 (less than B) to a value above it (more than C), "Io/Is" will switch from a value in a low range (less than b) to a value in a relatively high range (more than c). These two ranges for "Io/Is" can then be used to represent "logic 0" and "logic 1" outputs respectively.

If "Ii/Is" represents the sum of two incoming binary logic signals, (i) and (ii), the values of the incoming signals representing "1" and "0" inputs can be selected as follows:

1. AND gate operation
(i) and (ii) each have zero or insignificant intensity for a "0" input;
(i) and (ii) each alone have an intensity equivalent to "Ii/Is" in a range (A to B) which lies within the hysteresis loop 10 for a "1" input such that (i) and (ii) "1" inputs summed have an intensity equivalent to "Ii/Is" more than C;
giving the following logic table:

| (i) | (ii) | "Io/Is" |
|---|---|---|
| 0 | 0 | 0 |
| 0 | 1 | 0 |
| 1 | 0 | 0 |
| 1 | 1 | 1 |

2 OR gate operation
(i) and (ii) each have zero or insignificant intensity for a "0" input;
(i) and (ii) each alone have an intensity equivalent to "Ii/Is" more than C for a "1" input;
giving the following logic table;

| (i) | (ii) | "Io/Is" |
|---|---|---|
| 0 | 0 | 0 |
| 0 | 1 | 1 |
| 1 | 0 | 1 |

-continued

| (i) | (ii) | "Io/Is" |
|---|---|---|
| 1 | 1 | 1 |

It can be seen that the step increase 9 occurs as part of a hysteresis loop 10 which includes a step decrease 11. The step decrease 11 applies when "Io/Is" has dropped to a critical value c'. If the range of values for "Io/Is" greater than c' is taken to represent a "logic 1" output, then it can be seen that the switch offers AND gate operation as above but with a memory characteristic. This is because once "Io/Is" has shown a "logic 1" output if only one of the incoming signals drops to a 0" input, "Io/Is" will continue to show the "logic 1" output. Only when both incoming signals have dropped to a "0" input will "Io/Is" reach the step decrease 11 and switch to a "logic 0" output. This is represented by the following logic table;

3. AND gate operation with memory characteristic (i) and (ii) having values in the sequential order of combinations shown;

| (i) | (ii) | "Io/Is" |
|---|---|---|
| 0 | 0 | 0 |
| 0 | 1 | 0 |
| 1 | 0 | 0 |
| 1 | 1 | 1 |
| 1 | 0 | 1 |
| 0 | 0 | 0 |

It will be understood that after the 1-1 combination of values for (i) and (ii), the combinations 1-0 and 0-1 are interchangeable. Only the 1-0 combination has been shown here however, and in following logic tables with memory characteristics, to reflect the practical danger that switching sequentially from 1-0 to 0-1 might take the amplifier through a 0-0 condition, and so cancel the memory characteristic.

Further, the memory characteristic can be modified by applying an optical bias (iii) to the amplifier 1, and changing the values of (i) and (ii) for a "1" input, as follows:

4. AND gate operation with biased memory characteristic

Optical bias (iii) has an intensity equivalent to "Ii/Is" slightly above A;

(i) and (ii) each have zero or insignificant intensity for a "0" input;

(i) and (ii) each alone has an intensity for a "1" input such that (iii) plus that intensity is equivalent to "Ii/Is" less than B but (iii) plus two times that intensity is equivalent to "Ii/Is" more than C;

giving the following logic table;

| bias (iii) | (i) | (ii) | "Io/Is" |
|---|---|---|---|
| on | 0 | 0 | 0 |
| on | 0 | 1 | 0 |
| on | 1 | 0 | 0 |
| on | 1 | 1 | 1 |
| on | 1 | 0 | 1 |
| on | 0 | 0 | 1 |
| off | 0 | 0 | 0 |

An optical bias (iii) can also be used to produce OR gate operation with a memory characteristic as follows:

5. OR gate operation with biased memory characteristic

Optical bias (iii) has an intensity as under 4 above;

(i) and (ii) each have zero or insignificant intensity for a "0" input;

(i) and (ii) each alone have intensity for a "1" input such that (iii) plus that intensity is equivalent to "Ii/Is" more than C;

giving the following logic table;

| bias (iii) | (i) | (ii) | "Io/Is" |
|---|---|---|---|
| on | 0 | 0 | 0 |
| on | 0 | 1 | 1 |
| on | 1 | 0 | 1 |
| on | 1 | 1 | 1 |
| on | 1 | 0 | 1 |
| on | 0 | 0 | 1 |
| off | 0 | 0 | 0 |

Referring to FIG. 2b, using a drive current which produces a material gain in the amplifier 1 of 0.65 times the lasing threshold gain, the amplifier 1 shows behaviour of a second type which can be exploited as a logical NAND/NOR gate. Again, in the figure, "Io" is plotted against "Ii", both being normalised against "Is". It can be seen that in this case "Io/Is" shows a clockwise hysteresis loop 12 in response to "Ii/Is", which loop 12 includes a step decrease 13 in response to increasing "Ii/Is", and a step increase 14 in response to decreasing "Ii/Is".

By selecting ranges of values of "Io/Is" as "logic 1" and "logic 0" outputs, for instance from G to H and from E to F respectively, it can be seen that the amplifier 1 will act as a switch as described above but with reversed logical outputs. Because of the direction, and position with regard to zero "Io/Is", of the hysteresis loop 12, it is preferable to use an optical bias (iv). Without an optical bias (iv), there are two ranges of values of "Ii/Is", g to h and g' to h', which will produce a "logic 0" output value of "Io/Is". To avoid ambiguity, in case for instance of noise or malfunction, the optical bias (iv) should be equivalent to a value of "Ii/Is", greater than h', which will bring the switch into an operating range excluding the range of values of "Ii/Is", g' to h', which introduces ambiguity. Employing an optical bias (iv), the amplifier offers the following modes of operation:

6. NAND gate operation

Optical bias (iv) has an intensity equivalent to "Ii/Is", just above e' which can produce a "logic 1" output of "Io/Is", but lies well below the hysteresis loop 12;

incoming binary logic signals (i) and (ii) each have zero or insignificant intensity for a "0" input;

(i) and (ii) each alone have an intensity for a "1" input such that (iv) plus that intensity is equivalent to "Ii/Is" in the range, e' to e, which can produce a "logic 1" output of "Io/Is" but lies below the hysteresis loop 12, but such that (iv) plus two times that intensity is equivalent to "Ii/Is" in the range, g to h, which produces a "logic 0" output of "Io/Is";

giving the following logic table;

| bias (iv) | (i) | (ii) | "Io/Is" |
|---|---|---|---|
| on | 0 | 0 | 1 |
| on | 0 | 1 | 1 |
| on | 1 | 0 | 1 |
| on | 1 | 1 | 0 |

By changing the relative values of the bias (iv) and each incoming binary logic signal (i) and (ii), NAND gate operation with a memory characteristic can also be achieved, as follows:

7. NAND gate operation with biased memory characteristic

Optical bias (iv) has an intensity as under 6 above;

incoming binary logic signals (i) and (ii) each have zero or insignificant intensity for a "0" input;

(i) and (ii) each alone have an intensity for a "1" input such that (iv) plus that intensity is equivalent to "Ii/Is" in a range, e to f, within the hysteresis loop 12, while (iv) plus two times that intensity is equivalent to "Ii/Is" in the range, g to h, which produces a "logic 0" output of "Io/Is";

giving the following logic table, (i) and (ii) having values in the sequential order of combinations shown;

| bias (iv) | (i) | (ii) | "Io/Is" |
|---|---|---|---|
| on | 0 | 0 | 1 |
| on | 0 | 1 | 1 |
| on | 1 | 0 | 1 |
| on | 1 | 1 | 0 |
| on | 1 | 0 | 0 |
| on | 0 | 0 | 1 |

8. NOR gate operation

Optical bias (iv) has an intensity equivalent to "Ii/Is" in the range e' to e, just below the hysteresis loop 12;

(i) and (ii) each have zero or insignificant intensity for a "0" input;

(i) and (ii) each alone have intensity for a "1" input such that (iv) plus that intensity, or plus two times that intensity, is equivalent to "Ii/Is" in the range, g to h, which produces a "logic 0" output of "Io/Is";

giving the following logic table;

| bias (iv) | (i) | (ii) | "Io/Is" |
|---|---|---|---|
| on | 0 | 0 | 1 |
| on | 0 | 1 | 0 |
| on | 1 | 0 | 0 |
| on | 1 | 1 | 0 |
| on | 1 | 0 | 0 |
| on | 0 | 0 | 1 |

It will be noticed that NOR gate operation as above shows no memory characteristic. However, by introducing a higher value of the optical bias (iv), both NAND and NOR operation show a memory characteristic, as follows:

9. NAND gate operation with modified biased memory characteristic

Optical bias (iv) has an intensity equivalent to "Ii/Is" in the range, e to f, which lies within the hysteresis loop 12;

(i) and (ii) each have intensities as under 7 above;

giving the following logic table, (i) and (ii) having values in the sequential order of combinations shown;

| bias (iv) | (i) | (ii) | "Io/Is" |
|---|---|---|---|
| on | 0 | 0 | 1 |
| on | 0 | 1 | 1 |
| on | 1 | 0 | 1 |
| on | 1 | 1 | 0 |
| on | 1 | 0 | 0 |
| on | 0 | 0 | 0 |
| off | 0 | 0 | reset |

It will be seen that when the optical bias (iv) and both (i) and (ii) are at zero, "Io/Is" is merely reset rather than giving an output value since the ranges of "Io/Is" selected for "logic 0" and "logic 1" outputs E to F and G to H, do not include zero.

10. NOR gate operation with memory characteristic

Optical bias (iv) has an intensity as under 9 above;

(i) and (ii) each have intensities as under 8 above;

giving the following logic table;

| bias (iv) | (i) | (ii) | "Io/Is" |
|---|---|---|---|
| on | 0 | 0 | 1 |
| on | 0 | 1 | 0 |
| on | 1 | 0 | 0 |
| on | 1 | 1 | 0 |
| on | 1 | 0 | 0 |
| on | 0 | 0 | 0 |
| off | 0 | 0 | reset |

Figure 3:
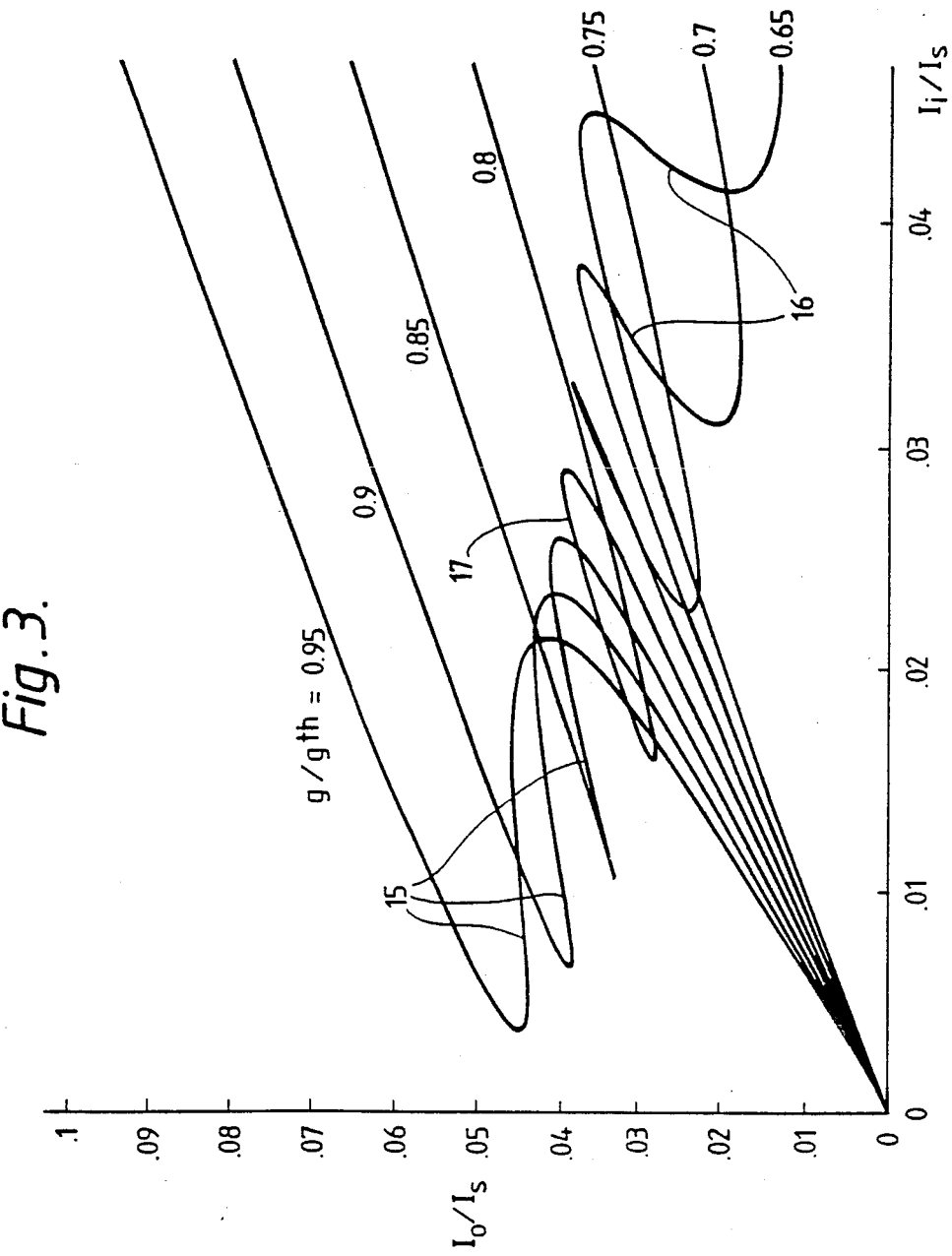
FIG. 3 shows a relationship between input and output radiation intensities for the optical switch of FIG. 1.

Referring to FIG. 3, it is thought that the switching behaviour described above is derived from a relationship between "Io/Is" and "Ii/Is", as affected by the driving current supplied to the amplifier 1. This relationship has been plotted for a range of values of driving current, represented by the ratio of the amplifier gain in operation to the lasing threshold gain of the amplifier, g/gth.

It can be seen that for higher values of g/gth of 0.85 and above, the relationship shows an open, upwards loop 15. For lower values, of 0.7 and below, the relationship shows an open, downwards loop 16. In fact the downwards loop 16 should occur for values of g/gth of up to and including 0.74. It is thought to be these loops 15, 16, within which the value of Io/Is is bistable, which introduce the hysteresis loops 10,12 of FIGS. 2a and 2b. (Bistability rather than tristability occurs because the linking portions of the loops 15, 16, with opposite Ii/Is direction, are unstable).

Figure 4:
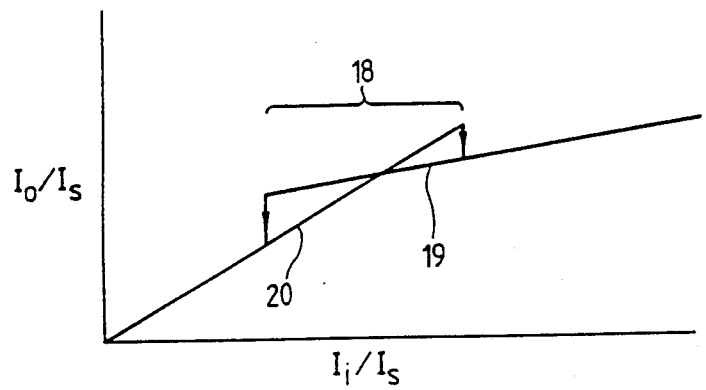
FIG. 4 shows in schematic form the optical output response of the switch of FIG. 1 to an optical switching signal for a special case of the operating conditions.

For a range of values of g/gth lying between 0.74 and 0.85, the relationship shows a closed loop 17, and the amplifier 1 shows behaviour of a third type. Referring to FIG. 4, this closed loop 17 indicates a double hysteresis loop 18 with two step decreases in "Io/Is", a first part 19 of the loop 18 being traversed in a clockwise direction (for increasing input) and a second part 20 being traversed in an anticlockwise direction (for decreasing input).

To convert the normalised intensities of FIGS. 2 to 4 to optical input power levels, for the amplifier 1 described above the scaling intensity Is has a value of about $8 \times 10^5$ W/cm$^2$. Over the active cross section of the amplifier diode, this corresponds to a factor $8 \times 10^9 \times 0.4 \times 10^{12}$ W, or $3.2 \times 10^3$ W. Hence it can be seen from FIG. 3 that at the higher value of g/gth, 0.95, the open, upwards loop 15 occurs between values of approximately 16 $\mu$W and 64 $\mu$W for Ii. However, at the lower value of g/gth, 0.7, the open, downwards loop 16 occurs between values of approximately 100 $\mu$W and 120 $\mu$W for Ii. It can be expected that these higher values of Ii required to obtain optical bistability are a result of the associated lower value of g/gth. There is, here, a trade-off. If the source 2 is tuned to produce a signal which is closer to a cavity resonance of the amplifier 1, optical bistability is achieved at lower values of Ii but the loops 15,16 are reduced in size. Conversely, if the detuning of the source 2 is increased, optical bistability is achieved at higher values of Ii but the loops 15,16 are larger.

Another factor which affects the size of the loops 15,16 and the values of Ii associated with optical bistability is the reflectivity of the reflecting facet of the amplifier 1. That is, the "back" facet of the amplifier 1 which acts neither as an input nor as an output port. By increasing the reflectivity of this facet, for instance by the use of a high-reflectivity coating, the depth of the optical bistabilities produced can be increased. That is, the ranges of values of "Io/Is" taken to represent "logic 0" and "logic 1" outputs can be selected to lie further apart. However, at the same time the values of Ii at which optical bistability occurs increase. (Uncoated, as in the arrangement of FIG. 1, the reflecting facet of the amplifier 1 has a relectivity of about 30%).

Figure 5:
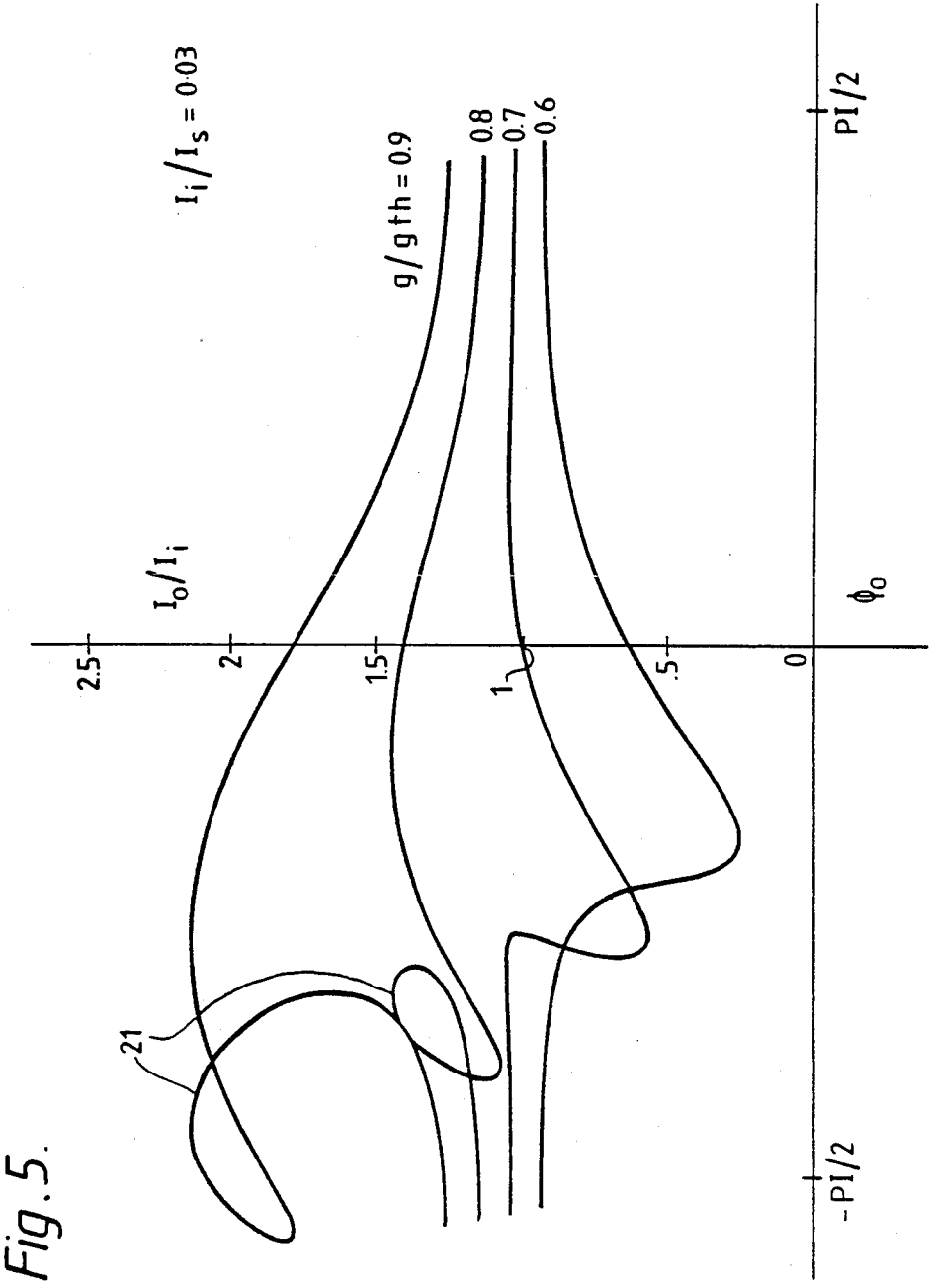
FIG. 5 shows a spectral response of the switch of FIG. 1.

Further information on the hysteresis loops of FIG. 3 can be obtained from the calculated spectral response of the amplifier for fixed input power. Referring to FIG. 5, the spectral response curves plotted for a range of values of $\phi_o$, the input signal phase detuning from a cavity resonance of the amplifier, for a fixed "Ii/Is" of 0.03, and for values of g/gth as marked, show loops 21 associated with the hysteresis loops of FIG. 3 at gains g/gth of 0.8 and 0.9. For gains g/gth of 0.7 and 0.6, the spectral response curves resemble those seen for passive Fabry-Perot devices.

The speed of switching of an optical switch according to an embodiment of the present invention can be assessed by looking at the device response to an optical input signal varying sinusoidally with time.

Figure 6:
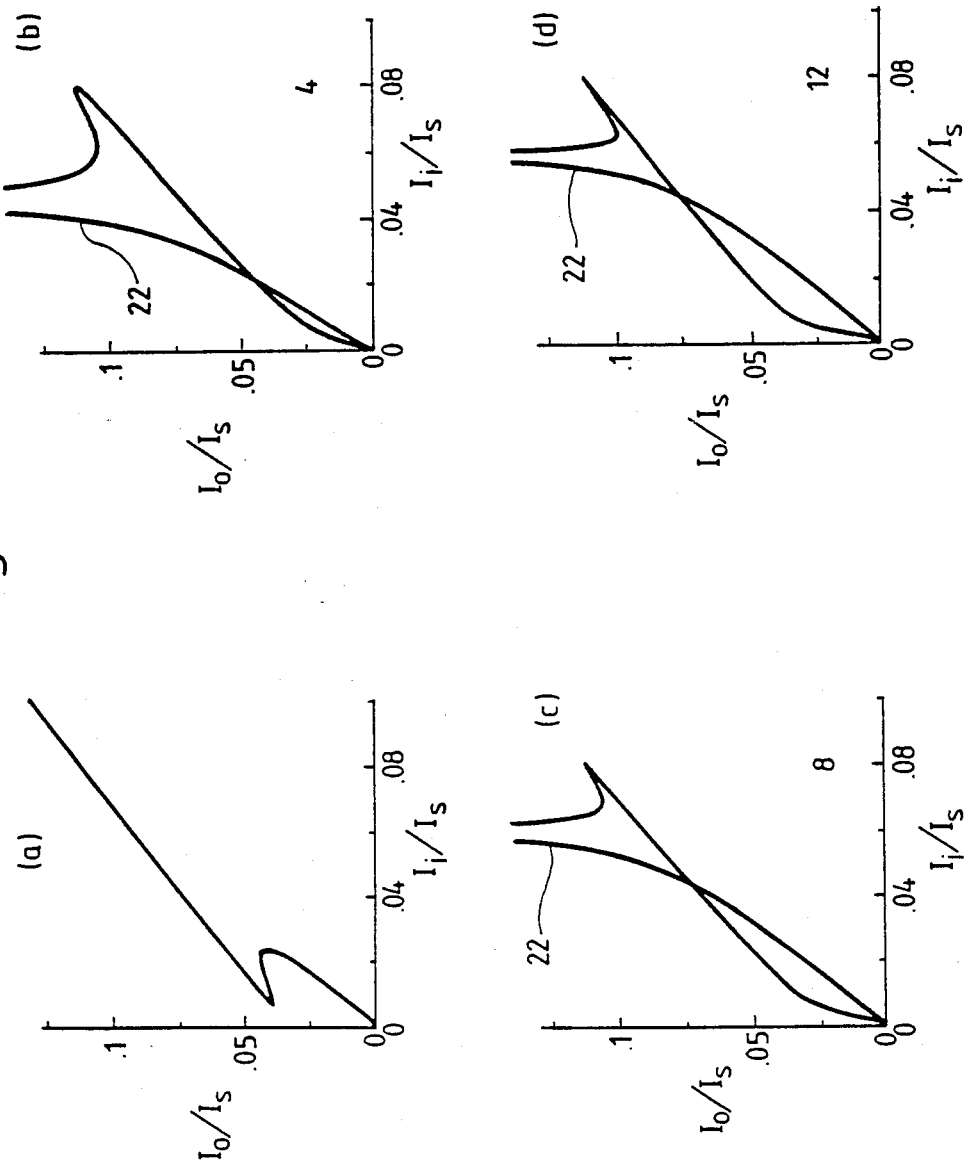
FIGS. 6 to 8 show the response of the switch of FIG. 1 to a high frequency sinusoidal optical input signal.
Figure 7:
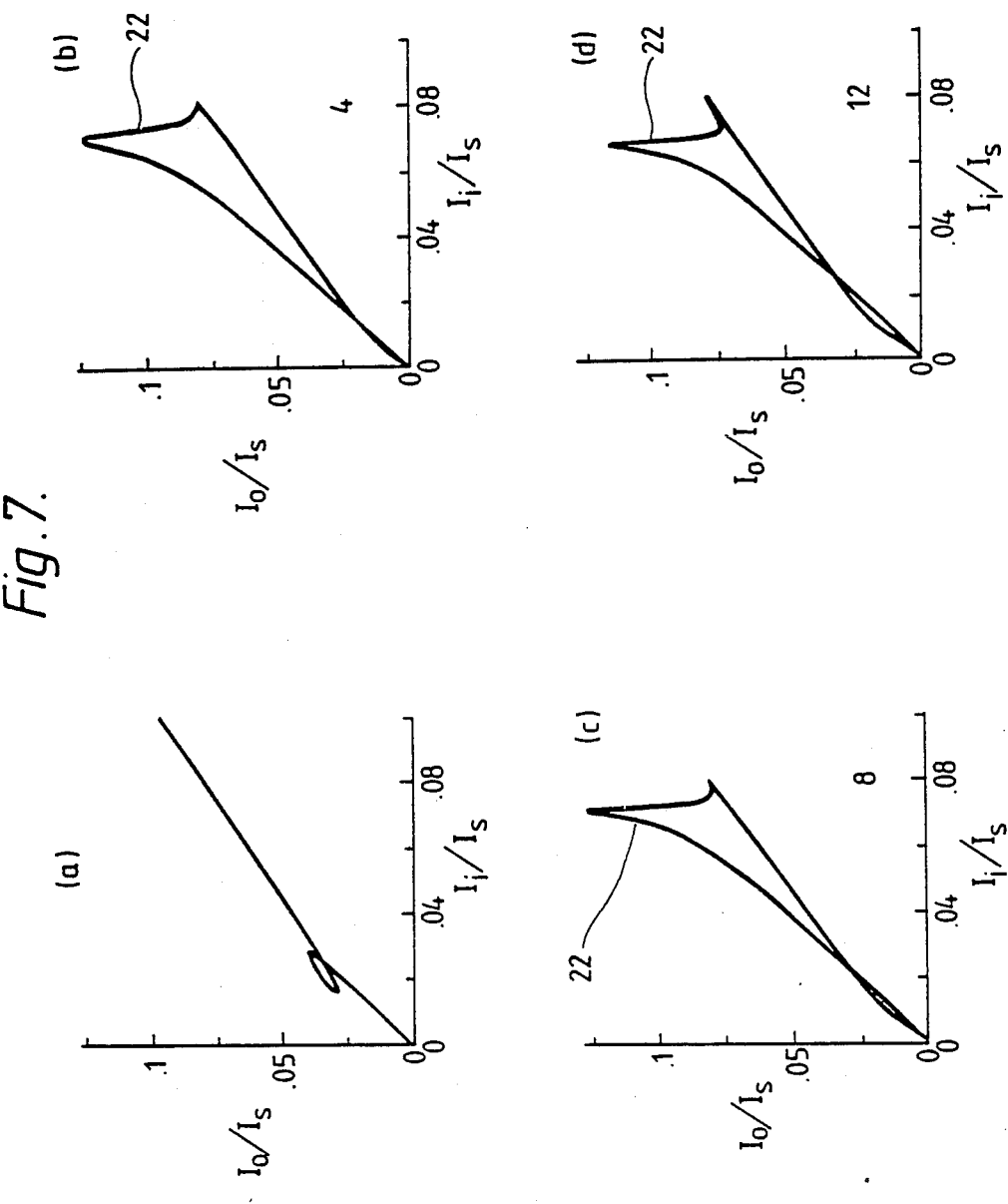
Figure 8:
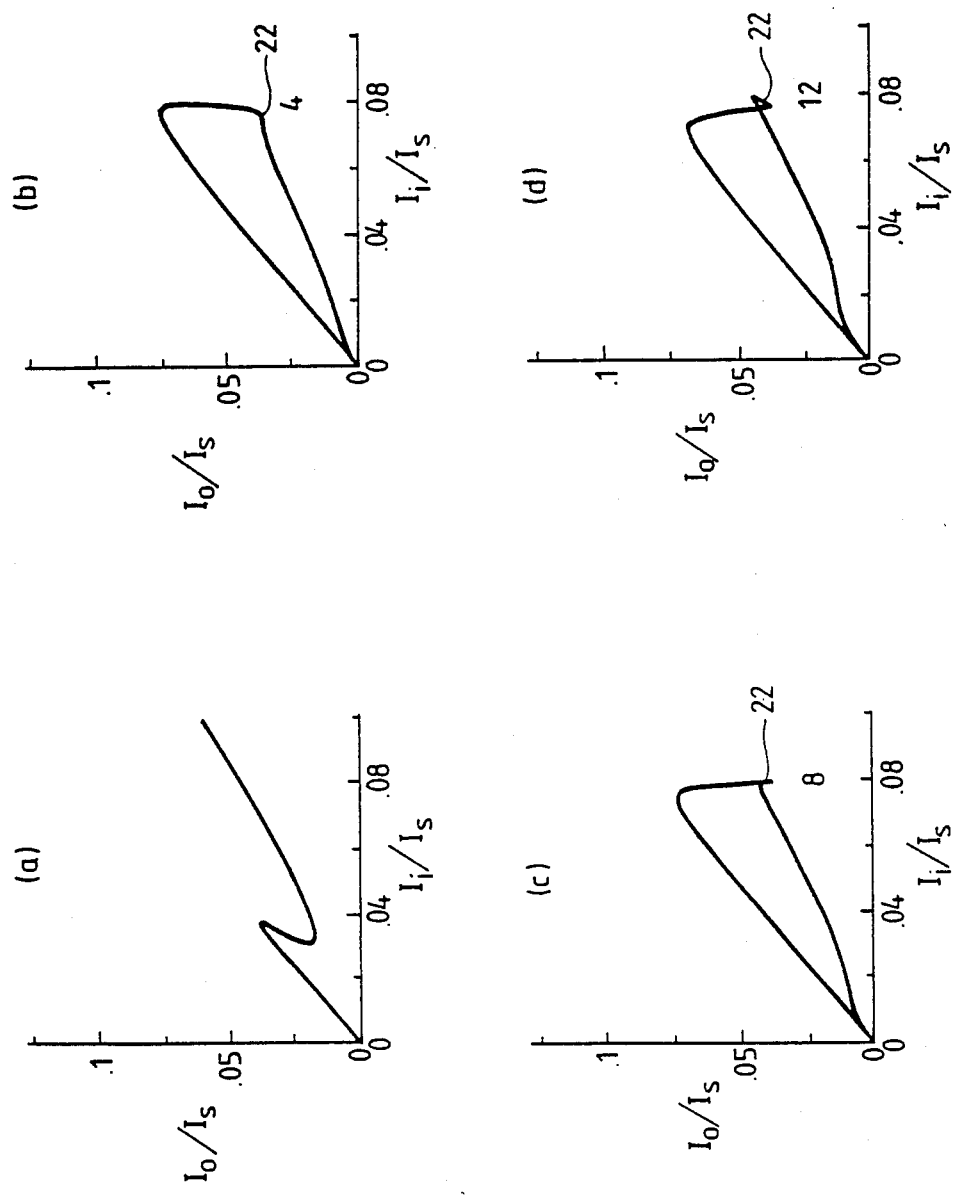

Referring to FIGS. 6, 7 and 8, in each case calculated optical output response is shown for a steady state input signal (graph (a)), and for sinusoidal input signals of periods equal to 4, 8 and 12 times the carrier recombination time of about 1.7 nsecs (graphs (b) to (d) respectively). (A steady state signal in this context is a signal whose repetition rate is of the order of KHz or less. The value of g/gth is different for each Figure, being 0.9, 0.8, and 0.7 for FIGS. 6, 7 and 8 respectively. The first graph (a) of each Figure thus corresponds to one of the plotted curves on FIG. 3.

From the observed device response to the sinusoidal signals, it would seem that the switching time between stable gain states, at least where the optical switch is being used as an AND/OR gate, is likely to be of the order of the carrier recombination time. Hence the maximum clock rate at which the switch will operate will be limited by nanosecond switching times.

Intensity spikes 22 can be observed on the device response curves. These are understood to stem from changes in the material refactive index of the amplifier 1 due to changes in the optical input intensity. In the case of FIG. 8, it can be seen that these spikes 22 are directed downwards and are only vestigial.

Figure 9:
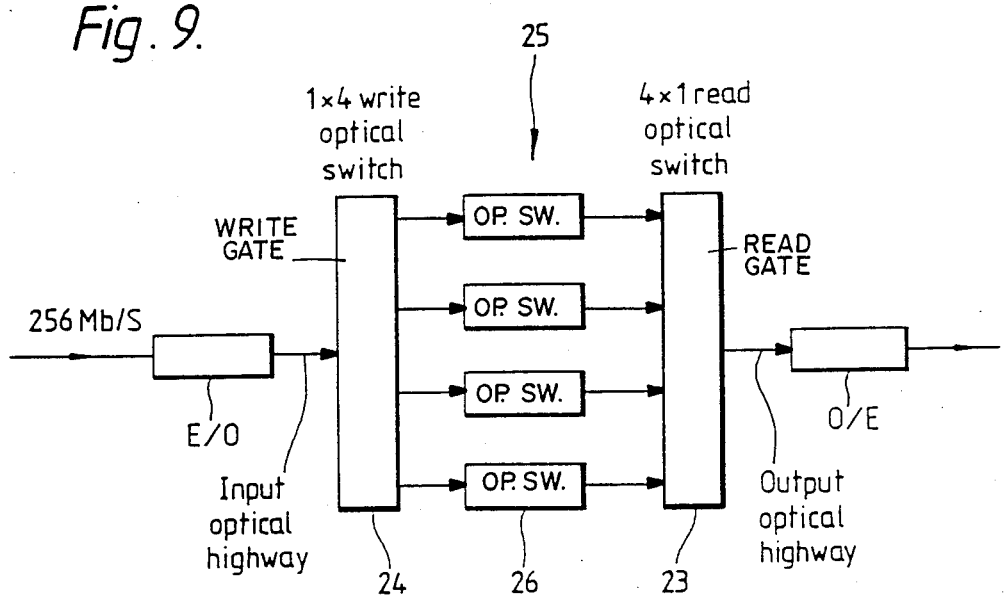
FIG. 9 shows a schematic representation of an optical time—division multiplexing arrangement comprising switches as shown in FIG. 1.

Referring to FIG. 9, optical switches 26 according to embodiments of the present invention can be used in an array for instance in optical time-division switching. Using LiNbO$_3$ directional coupler matrices to provide a read gate 23 and a write gate 24, four 64 Mb/s digitally encoded colour video signals which are time multiplexed in bit-interleaved form are applied to a time switch 25 comprising optical switches 26 according to embodiments of the present invention. The write gate 24 suplies the 256 Mb/s time-multiplexed signal to each switch 26 in turn. The switches 26 each store the optical signals for a frame period. The stored signals can then be read out according to a required sequence and time switching has been accomplished.

The optical switches 26 can be reset by the use of optical clock signals.

In another application, optical switches according to embodiments of the present invention could be used in optical regenerators. Using an incoming digital signal and clock pulses as the two incoming binary logic signals (i) and (ii) referred to above, the incoming digital signal can in effect be regenerated and sent onwards.

It is not necessary that an embodiment of the present invention should include all the features described above. In particular it is not necessary that a Fabry-Perot laser diode be used as the amplifier 1. Instead, for instance, a DFB laser diode may be used.

I claim:

1. An optical switch comprising:
   a semi-conductor or optical amplifier having optical input and output ports located at a common end of an amplifier cavity,
   means for coupling a detuned optical input switching signal to the amplifier, and
   means for applying a driving electrical current to the amplifier, which driving current is selected to have either one of at least two different values, at a first value of which driving current the optical amplifier is operated as an AND/OR logic gate for input optical signals and at a second value of which driving current the optical amplifier is operated as a NAND/NOR logic gate for input optical signals.

2. An optical switch according to claim 1 wherein the amplifier comprises a laser and the driving current lies below the lasing threshold current of that laser.

3. An optical switch according to claim 2 wherein the amplifier comprises a passive Fabry-Perot cavity laser and the switching signal is detuned from a cavity resonance of the laser.

4. An optical switch according to claim 2 wherein the amplifier comprises a laser having optical feedback strutures distributed along an optical lasing cavity and the switching signal is detuned from an output peak on the short wavelength side of a stop band of the laser, said stop band being a range of optical wavelengths which, when input to said amplifier, are substantially reflected therefrom.

5. An optical switch as in any of the preceding claim wherein an end facet of the amplifier cavity opposite said input and output ports is coated with a high-reflectivity coating.

6. An optical time-division switch comprising an optical switch according to any one of the preceding claims 1, 2, 3, or 4.

7. An optical signal regenerator comprising an optical switch according to any one of the preceding claims 1, 2, 3, or 4.

8. An optical switching method utilizing an optical switch providing AND/OR logical operations on input optical signals in a first condition and providing NAND/NOR logical operations on input optical signals in a second condition, said method comprising:
   providing a semi-conductor optical signal amplifier having an amplifying cavity with a common facet providing both an optical signal input port and an optical signal output port;
   inputting optical logic level signals to said input port;

establishing an electrical driving current of a first magnitude through said semi-conductor optical signal amplifier to establish said first condition wherein AND/OR logic operations are performed on said input optical signals to provide output optical signals from said facet; and alternatively establishing an electrical driving current of a second magnitude through said semi-conductor optical signal amplifier to establish said second condition wherein NAND/NOR logic operations are performed on said input optical signals to provide output optical signals from said facet.

9. An optical signal logic switch capable of accepting plural combined logic level optical signals at an optical input port and of providing a corresponding AND/OR or NAND/NOR Boaleon logic optical resultant signal at an optical output, said switch comprising:

a semi-conductor optical amplifier having an electrical drive bias current path therethrough and also having an optical amplifying cavity with common facet which acts both as an optical signal input port and an optical signal output port; and bias current control means connected to establish a predetermined electrical bias current through said path which bias current magnitude determines whether an optical output signal represents logical AND/OR or logical NAND/NOR operations upon the optical input signals.

* * * * *